No. 870,304.　　　　　　　　　　　　　　PATENTED NOV. 5, 1907.
G. MILNER.
POWER TRANSMISSION GEARING.
APPLICATION FILED FEB. 7, 1907.

3 SHEETS—SHEET 1.

Fig. 1.

George Milner,
INVENTOR.

WITNESSES:

By C. A. Snow & Co.
ATTORNEYS

No. 870,304. PATENTED NOV. 5, 1907.
G. MILNER.
POWER TRANSMISSION GEARING.
APPLICATION FILED FEB. 7, 1907.

3 SHEETS—SHEET 2.

WITNESSES:

George Milner,
INVENTOR.

By C. A. Snow & Co.
ATTORNEYS

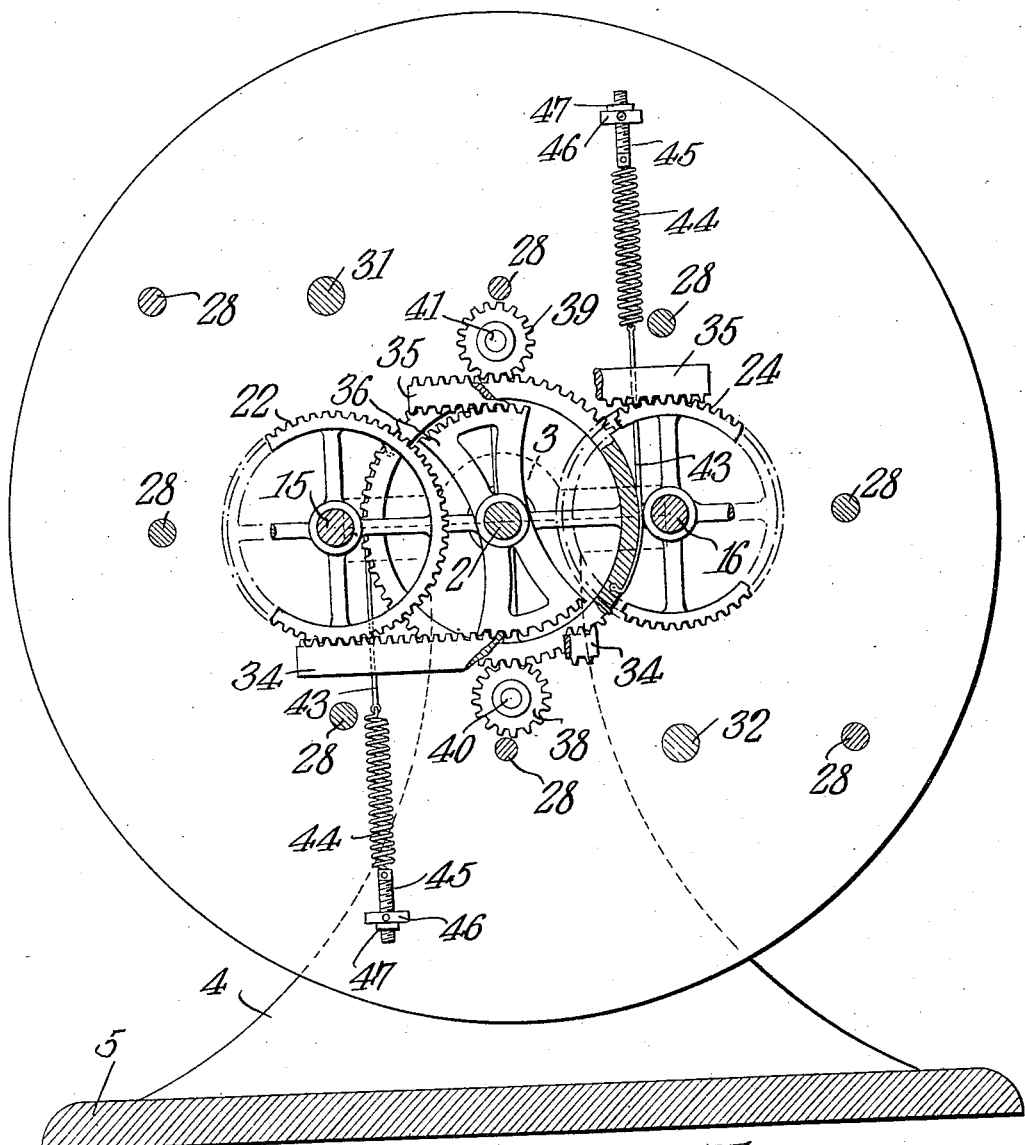

UNITED STATES PATENT OFFICE.

GEORGE MILNER, OF BROOKLYN, NEW YORK, ASSIGNOR TO THE MILNER POWER MULTIPLYING MACHINE COMPANY, INC., OF BROOKLYN, NEW YORK.

POWER-TRANSMISSION GEARING.

No. 870,304.     Specification of Letters Patent.     Patented Nov. 5, 1907.

Application filed February 7, 1907. Serial No. 356,228.

*To all whom it may concern:*

Be it known that I, GEORGE MILNER, a citizen of the United States, residing at Brooklyn, in the county of Kings and State of New York, have invented a new and useful Power-Transmission Gearing, of which the following is a specification.

This invention has reference to improvements in mechanical movements or power transmission gearing, and its object is to obtain an increase of power between a driving member and a driven member. More especially is this true where it is desired to produce an increased starting torque.

The invention consists essentially in a driving member and a driven member and intermediate gears between the two members with included elastic connections so arranged that the driving member may have a considerable extent of travel before the driven member is brought up to speed, so that the time element enters into the movements to such an extent as to produce a large increase of power between the driving member, which may be directly connected to an engine or other driving unit, and the driven member, which may be directly connected to the work.

The invention will be fully understood from the following description taken in connection with the accompanying drawings forming part of this specification, in which,—

Figure 2:
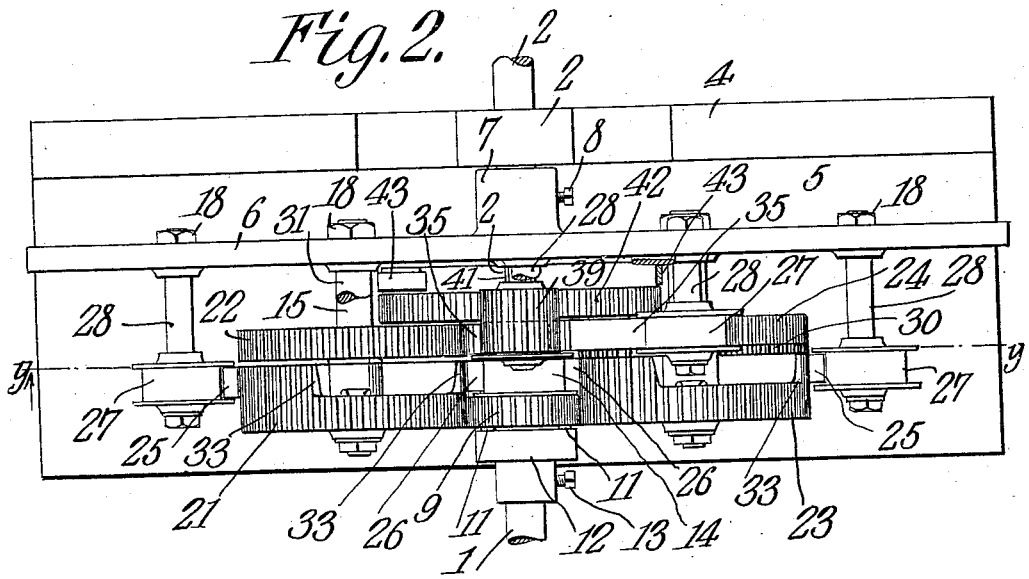
Figure 3:
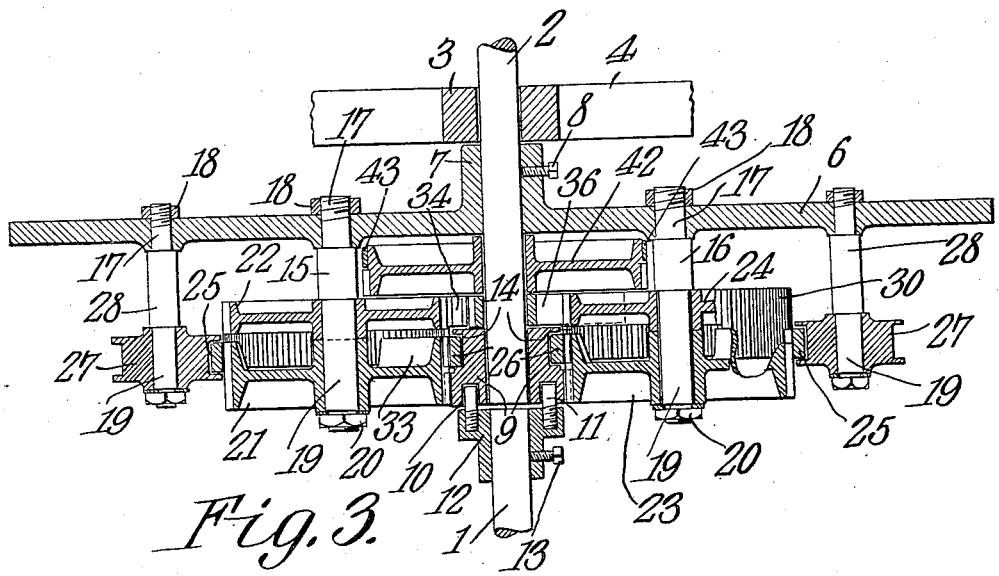

Figure 1 is an elevation of the transmission gearing with some parts broken away and others shown in section; Fig. 2 is a top plan view of the transmission gearing with some parts broken away and other parts shown in section; Fig. 3 is a transverse section on the line x—x of Fig. 1; and Fig. 4 is a vertical section on the line y—y of Fig. 2.

Referring to the drawings, there is shown a drive shaft 1 which may be the drive shaft of an engine or the armature shaft of an electric motor or a countershaft receiving power from some prime mover. There is also a driven shaft 2 mounted in bearings of which one, indicated by the numeral 3, is shown, which bearings may be mounted upon a standard 4 rising from a base plate 5. While but one bearing 3 for the shaft 2 is shown, it will be understood that other bearings may be provided for this shaft and that the shaft 1 may also have suitable bearings, as may be found necessary or desirable.

Carried by the shaft 2 adjacent to its bearing 3 is a disk 6 having a central hub 7 through which may be passed a set screw 8 to secure the disk to the shaft 2, or any other desired means of making the disk 6 fast upon the shaft 2 may be employed.

The shaft 2 extends beyond the face of the disk for a distance and its free end is close to the corresponding end of the shaft 1. Upon the free end of the shaft is loosely mounted a pinion 9 in the outer face of which are formed sockets 10 for the reception of studs 11 fast in the contiguous face of a coupling head 12 secured upon the end of the shaft 1 by a set-screw 13 or other desirable means. The pinion 9 is therefore constrained to move in unison with the rotation of the shaft 1. Other coupling means may be employed and those described are only shown as an example of a coupling which will answer the desired purpose.

The end of the pinion 9 toward the disk 6 is formed with an annular groove 14 to constitute a guide roller, as will hereinafter appear.

Projecting from the face of the disk 6 in the same direction as the portion of the shaft 2 which carries the pinion 9 are two studs 15—16 equi-distant from the shaft 2 on a diameter of the disk 6, so that these studs 15—16 and the shaft 2 are all in the same diametric plane. Each stud 15 and 16 has a reduced end 17 passing through and to the rear of the disk 6 where the stud is threaded and receives a nut 18 by means of which the stud is securely fastened to the disk 6. The other or free end of each stud 15—16 is formed into a journal 19 and the extreme outer end is threaded to receive a nut 20. Upon the stud 15 is mounted a wide gear wheel 21 and between this gear wheel 21 and the disk 6 the stud also carries another narrower gear wheel 22, while the stud 16 carries upon its journal end a wide gear wheel 23 and a narrower gear wheel 24 corresponding to the gear wheels 21 and 22 on the journal end of the stud 15. Each gear wheel 21 and 23 has its periphery wide enough to mesh with the pinion 9 and cover the grooved portion 14 of said pinion.

The pinion 9 engages about one-half or a little less of the width of the peripheries of the gear wheels 21 and 23, while the other halves of these peripheries, that is, the halves toward the disk 6, engage rack bars 25—26 movable in planes at right angles to the diametric plane cutting the journal bearings of the gear wheels 21 and 23 and the shaft 2. There are two racks for each gear wheel 21 or 23, one rack 25 engaging the periphery of the gear wheel 21 or 23 on a diametric plane cutting the journal supports of these gear wheels at a point remote from the shaft 2 and there supported by grooved rollers 27. These rollers are mounted upon journals 19 formed on the free ends of studs 28 having reduced ends 17 passing through the disk 6 and clamped thereto by nuts 18. The other racks 26 engage the gear wheels 21 and 23 on the same diametric side as does the pinion 9 but at a point closer to the disk 6, and these racks 26 are supported at their inner ends by the grooved portion 14 of the pinion 9 and at their outer ends by appropriately located grooved rollers 27 mounted upon studs 28, in all respects similar to the grooved rollers 27 supporting the racks 25.

The gear wheels 21 and 23 are each of a diameter twice that of the pinion 9 and the gear wheels 22 and 24 are of the same diameter as the gear wheels 21 and 23.

There are other gear wheels 29—30 of the same diameter and also of the same width of periphery as the gear wheels 21 and 23, and these gear wheels 29—30 are mounted upon studs 31—32 respectively located with reference to the studs 15 and 16 in planes intersecting the diametric plane cutting at right angles the said studs 15 and 16. The studs 31 and 32 are shorter than the studs 15 and 16, so that the gear wheels 29 and 30 will engage the racks 25 and 26 and also the gear wheels 22 and 24; that is, the gear wheel 29 engages the gear wheel 22 and the respective racks 25 and 26, while the gear wheel 30 engages the gear wheel 24 and the respective racks 25 and 26.

Now, since the gear wheels 21 and 23 are coupled to the respective gear wheels 29 and 30 through the racks 25 and 26, the gear wheels of each pair will therefore turn in the same direction. For this reason, that portion of the peripheries of the gear wheels 21 and 23 which would otherwise mesh with the respective gear wheels 29 and 30 is cut away so that the peripheries of the gear wheels 21 and 23 engaging with the racks 25 and 26 are sectoral in shape, as shown at 33.

It will now be seen that when the pinion 9 is rotated by its connection with the shaft 1, motion is transmitted to the gear wheels 21 and 23 and through the sector portions 33 thereof to the respective racks 25 and 26, the latter moving, as will be evident, in opposite directions; and it will also be seen that as these racks engage the peripheries of the gear wheels 21 and 23 and of the respective companion gear wheels 29 and 30 at diametrically opposite points, as shown in the drawings, the journal bearings of these gear wheels are relieved from all strain, since they are only subjected to a neutral force.

The gear wheel 22 engages a rack 34 located at a point diametrically opposite its point of engagement with the gear wheel 29, and this rack 34 moves in a plane parallel with the plane intersecting the studs 15 and 16. Opposite its point of engagement with the gear wheel 22 the rack 34 is supported by a grooved roller 27 mounted upon a stud 28 fast on the disk 6.

The gear wheel 24 engages a rack 35 located at a point diametrically opposite from the engagement of the gear wheel 24 with the gear wheel 30, and this rack moves in a plane parallel with that of the movement of the rack 34 but in the opposite direction. The inner ends of these two racks 34 and 35 are engaged by the toothed periphery of a sector gear 36 mounted loosely upon the shaft 2 adjacent to the roller end of the pinion 9 and operating simply as an idler to support the ends of the racks 34 and 35 engaged thereby. The faces of the rack bars 34 and 35 opposite the point of engagement with the idler sector gear 36 are also provided with gear teeth and there engage pinions 38—39 respectively, that is, the rack bar 34 engages the pinion 38 and the rack bar 35 engages the pinion 39. These pinions 38 and 39 are mounted upon studs 40 and 41, respectively, fast on the disk 6 and in a plane cutting said studs and the shaft 2 at right angles to the plane cutting the studs 15 and 16 and the shaft 2. These pinions 38 and 39 are wide enough to engage the racks 34 and 35 as described and also engage the toothed periphery of a large gear wheel 42 loosely mounted upon the shaft 2 between the idler 36 and the face of the disk 6. This gear wheel 42 is about four times the diameter of the pinions 38 or 39 and is connected on diametrically opposite sides by flexible straps 43 to springs 44, the outer ends of which are connected to threaded rods 45 passing through studs 46 fast on the disk 6 and receiving nuts 47 by means of which and the threaded rods 45 the initial tension of the springs may be adjusted.

Now, let it be assumed that power is applied to the shaft 1 to rotate the same. The pinion 9 will rotate with the shaft 1. Motion is from this pinion transmitted to the gear wheels 21 and 23, and from these gear wheels through the racks 25 and 26 to the respective gear wheels 29 and 30, from whence motion is transmitted to the gear wheels 22 and 24. From these latter gear wheels 22 and 24 motion is transmitted to the racks 34 and 35 and from these racks to the pinions 38 and 39 which together coact to transmit motion to the large gear wheel 42 in the appropriate direction to extend the springs 44 which are connected directly to the disk 6, and, therefore, the stress under which these springs are put will ultimately cause the rotation of the disk 6 and the consequent rotation of the shaft 2 together with the load coupled thereto.

The relation of the gears is such that a large starting torque is obtained and through the reaction of the springs variations of load are readily taken care of.

I claim:—

1. In a mechanism of the class described, a driving member, a driven member, a pinion carried by the driven member and coupled to the driving member, gear wheels meshing with said pinion, pairs of rack bars receiving sliding motion from said gear wheels, other gear wheels receiving motion from said rack bars, other rack bars receiving motion from said last-named gear wheels, a gear train receiving motion from the last-named rack bars, and elastic connections between said gear train and the driven member.

2. In a mechanism of the class described, a driving member, a driven member, a pinion carried by said driven member and receiving motion from said driving member, gear wheels receiving motion from said pinion, oppositely-moving sliding rack bars receiving motion from said gear wheels, other gear wheels receiving motion from said rack bars, gear wheels meshing with said last-named gear wheels, rack bars moving at an angle to the motion of the first-named rack bars and receiving motion from said last-named gear wheels, pinions receiving motion from said last-named rack bars, a gear wheel mounted on the axis of the driven member and receiving motion from said pinions, and elastic connections between said last-named gear wheel and the driven member.

3. In a mechanism of the class described, a driving member, a driven member, a disk carried by and moving with the latter, a pinion mounted on the axis of the driven member and receiving motion from the driving member, gear wheels on opposite sides of and meshing with said pinion, sliding rack bars engaged by said gear wheels on diametrically opposite sides of the latter and in the plane of engagement with the pinions, other gear wheels engaged by said rack bars on opposite sides, still other gear wheels engaged by and receiving motion from the last-named gear wheels, rack bars receiving motion from the last-named gear wheels in planes at right angles to the planes of motion of the first-named rack bars, pinions receiving motion from said last-named rack bars, a gear wheel mounted on the axis of the driven member and receiving motion from said pinions, elastic connections between said last-named gear wheel and the disk, and supports upon the disk for the journals of the several gear wheels and for the rack bars.

4. In a mechanism of the class described, a drive shaft, a driven shaft in line therewith, a pinion mounted on said driven shaft and receiving motion from said drive shaft, a disk fast on said driven shaft, gear wheels mounted on said disk and engaging said pinion on opposite sides, rack bars engaged by said gear wheels and having roller bearings supported by said disk with the said pinion forming one of the roller bearings for the rack bars, other gear wheels mounted on said disk and engaged on opposite sides by the rack bars, still other gear wheels having the same axis of rotation as the gear wheels engaged by the aforesaid pinion and receiving motion from the gear wheels actuated by the rack bars, other rack bars moving in planes at right angles to the first-named rack bars and receiving motion from the last-named of the series of gears, pinions engaged by the last-named rack bars, a single gear wheel loosely mounted upon the driven shaft and receiving motion from the pinions, and adjustable springs connected to said last-named gear wheel and to the disk.

In testimony that I claim the foregoing as my own, I have hereto affixed my signature in the presence of two witnesses.

GEORGE MILNER. [L. S.]

Witnesses:
FREDERICK M. CULLY,
PETER F. DORAN.